US009084095B2

(12) United States Patent
Richardson

(10) Patent No.: US 9,084,095 B2
(45) Date of Patent: Jul. 14, 2015

(54) METHOD AND SYSTEM TO DELIVER SMS MESSAGES IN LONG TERM EVOLUTION (LTE) EVOLVED PACKET CORE (EPC)

(75) Inventor: Simon Richardson, Alpharetta, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 1280 days.

(21) Appl. No.: 12/606,364

(22) Filed: Oct. 27, 2009

(65) Prior Publication Data

US 2011/0098063 A1 Apr. 28, 2011

(51) Int. Cl.
*H04M 1/66* (2006.01)
*H04M 1/68* (2006.01)
*H04M 1/00* (2006.01)
*H04W 4/00* (2009.01)
*H04W 4/14* (2009.01)

(52) U.S. Cl.
CPC ..................... *H04W 4/14* (2013.01)

(58) Field of Classification Search
CPC ....... H04W 12/06; H04W 12/12; H04L 63/08
USPC .......... 455/411, 466, 556.1; 370/328; 726/11; 725/328
See application file for complete search history.

(56) References Cited

U.S. PATENT DOCUMENTS

| 7,088,692 | B1 * | 8/2006 | Gronroos | 370/328 |
| 7,596,806 | B2 * | 9/2009 | Chen | 726/11 |
| 2008/0207260 | A1 * | 8/2008 | Dent | 455/556.1 |
| 2010/0265884 | A1 * | 10/2010 | Vikberg et al. | 370/328 |
| 2010/0330962 | A1 * | 12/2010 | Han et al. | 455/411 |
| 2011/0021216 | A1 * | 1/2011 | Pudney et al. | 455/466 |
| 2011/0098063 | A1 * | 4/2011 | Richardson | 455/466 |

FOREIGN PATENT DOCUMENTS

WO 2009056932 A2 7/2009

OTHER PUBLICATIONS

3rd Generation Partnership Project; Technical Specification Group Services and System Aspects; Circuit Switched Fallback in Evolved Packet System; Stage 2 (Release 8), 3GPP TS 23.272 V8.3.0, Mar. 2009, 47 pages.
International Search Report and Written Opinion for International Application No. PCT/US2010/050443, mailing date Dec. 7, 2010, pp. 12.

(Continued)

*Primary Examiner* — William D Cumming
(74) *Attorney, Agent, or Firm* — Amin, Turocy & Watson, LLP

(57) ABSTRACT

A system and methodology that facilitates Short Message Service (SMS) delivery in a Long Term Evolution (LTE) environment is provided. In particular, an interface is provided, which enables a Mobility Management Entity (MME) to communicate directly with a Short Message Service Center (SMSC) to facilitate delivery of SMS in an evolved packet core (EPC). In one aspect, the interface can be most any SS7-based interface, such as a Gd interface. In another aspect, the interface can be an IP based (e.g., SS7 over IP) interface. Accordingly, the MME can utilize the interface to establish direct communication with the SMSC, without employing intermediate network elements (e.g., mobile switching centers).

20 Claims, 9 Drawing Sheets

(56) References Cited

OTHER PUBLICATIONS

Vodafone: "Discussion on the technical aspects of Native SMS over LTE". 3GPP Draft; S2-094610-Disc on Native SMS Over LTE, 3rd Generation Partnership Project (3GPP), Mobile Competence Centre; 650, Route Des Lucioles; F-06921 Sophia-Antipolis Cedex; France, No. Sophia; 20090630. XP050356090. Jun. 30, 2009, 8 pages.

Vodafone, China Mobile, Alcatel-Lucent, Catt, Huawei, Starent, ZTE: "SP-090429 SMS over LTE". pp. 1-9, XP002611731. URL: http://ftp.3gpp.org/specs/html-info/TD ocExMtg—SP-44-26397.htm. Jun. 4, 2009, 10 pages.

VoLGA: VoLGA Stage 2 v1.2.0 (Aug. 24, 2009) "Voice over LTE via Generic Access; Stage 2 Specification; Phase 1". pp. 1-89; XP002611732. Aug. 24, 2009.

\* cited by examiner

METHOD AND SYSTEM TO DELIVER SMS MESSAGES IN LONG TERM EVOLUTION (LTE) EVOLVED PACKET CORE (EPC)

TECHNICAL FIELD

The subject disclosure relates to wireless communications and, more particularly, to a cost effective and efficient architecture that facilitates delivery of Short Message Service (SMS) messages in a Long Term Evolution (LTE) environment.

BACKGROUND

Mobile data communication is evolving quickly because of global communication networks such as the Internet, intranets, laptops, PDAs (personal digital assistants) and increased requirements of workforce mobility. Third generation mobile system (3G) technologies (e.g., UMTS-Universal Mobile Telecommunications System) are considered enhancements to GSM (Global System for Mobile telecommunications) cellular standards. As the demand for increased capacity and speed of mobile telephone networks grows, fourth generation (4G) technologies, for example, Long Term Evolution (LTE) systems are rapidly being developed and implemented. In particular, LTE is a set of enhancements to UMTS that adopt 4G mobile communications technology, including an all-Internet Protocol flat networking architecture.

New technologies are required to deliver high-speed location and mobile terminal specific content to users. With LTE, the user experience can be significantly improved by supporting more demanding applications such as interactive TV, mobile video blogging, advanced games and/or professional services. In capacity terms, LTE meets key 4G requirements, for example, providing downlink peak rates greater than 100 Mbits/sec. Moreover, the LTE architecture is designed to be as simple as possible to deploy and operate, through flexible technology that can be used in a wide variety of frequency bands. In particular, the all-Internet Protocol (IP) network architecture employed by LTE, supports voice in the packet domain, for example, Voice over IP (VoIP), and is extremely efficient for data and/or VoIP traffic.

However, the LTE architecture does not support the circuit-switched architectures found in traditional mobile networks. Thus, Short Message Service (SMS) is not supported by the all-IP LTE architecture. Conventionally proposed solutions for the SMS problem in LTE involve the deployment of a new IP Multimedia Subsystem (IMS) based delivery that requires new/modified handset clients, new/modified IMS core and IMS messaging applications. An alternate approach proposes circuit switched (CS) fallback that involves modifying existing 2G and 3G mobile switching centers (MSCs) to enable SMS support in LTE. This approach would involve major development and take time to deploy across a large embedded base of MSCs.

SUMMARY

The following presents a simplified summary of the specification in order to provide a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

The systems and methods disclosed herein, in one aspect thereof, can facilitate efficient delivery of Short Message Service (SMS) in an all-Internet protocol (IP) 4G (fourth generation) network. Moreover, a communication interface is provided that can establish communication directly between a Mobility Management Entity (MME) and Short Message Service Center (SMSC) without employing intermediate 2G and/or 3G network elements, for example, mobile switching centers (MSCs). In one aspect, when a user equipment (UE) sends an SMS message, an eNodeB can transfer the SMS to the associated MME, for example, by employing circuit switch (CS) fallback delivery procedures. In particular, the MME can employ the communication interface to deliver the received SMS to the SMSC. For example, the interface can be most any SS7-based interface, such as a Gd interface, or an IP based such as, an SS7 over IP interface. Further, various protocols can be utilized for the communication, such as but not limited to, Mobile Application Part (MAP), IP-based protocols, etc. Additionally, the SMSC can employ multiple communication interfaces, as disclosed herein to establish communication with multiple MMEs. Accordingly, the SMSC can deliver the SMS to a disparate MME over the communication interface for sending the SMS to a destination UE attached to the disparate MME.

Yet another aspect of the disclosed subject matter relates to a method that can be employed to facilitate direct communication between an MME and SMSC for SMS delivery in an LTE network. Specifically, the method comprises receiving an SMS at an SMSC directly from a first MME over a first interface, such as, an SS7-based interface or an SS7 over IP (SS7oIP) interface. In one aspect, a database can be queried to retrieve information that facilitates determination of a path for routing the SMS. Based on the retrieved information, the SMS can be delivered to a second MME over a second interface, such as, an SS7-based interface or an SS7oIP interface. Additionally, a delivery report can be received from the second MME over the second interface and the delivery report can be sent to a source UE by transferring the delivery report to the first MME over the first interface.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
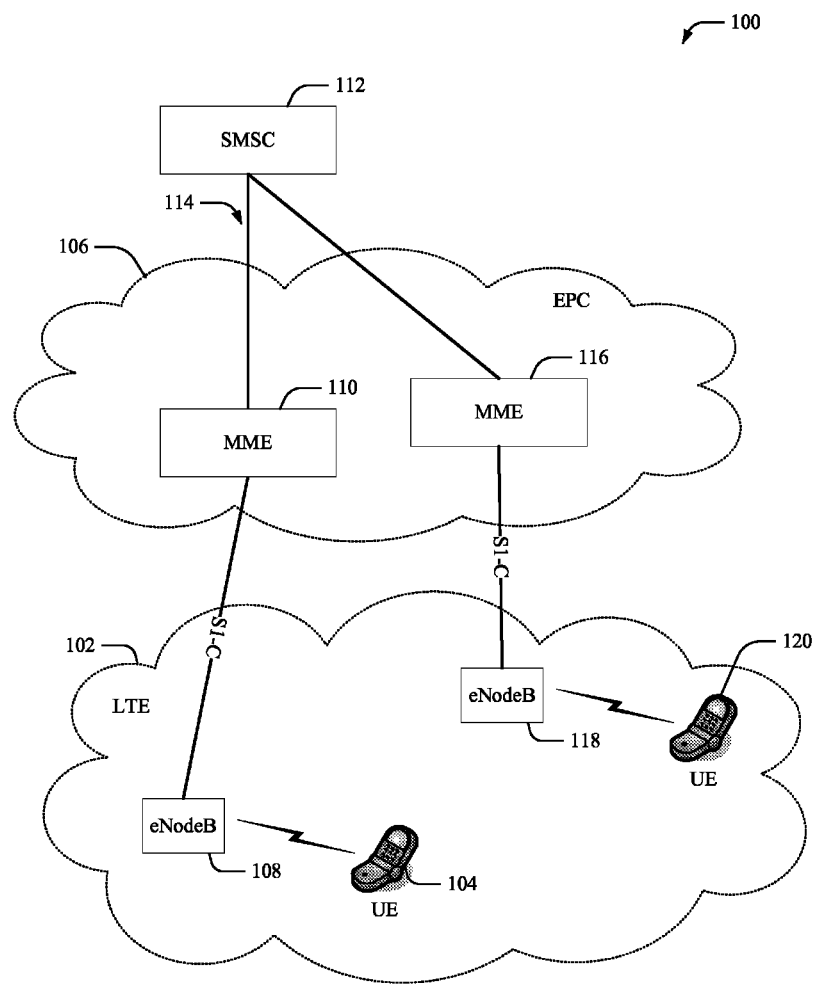
FIG. 1 illustrates an example system that facilitates Short Message Service (SMS) delivery in a Long Term Evolution (LTE) environment.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "platform," "service," "center," "entity," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the various embodiments.

In addition, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "mobile station," "mobile," subscriber station," "access terminal," "terminal," "handset," "mobile device," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms) which can provide simulated vision, sound recognition and so forth.

Conventionally proposed mechanisms for Short Message Service (SMS) in Long Term Evolution (LTE) systems involve the deployment of a new IP multimedia subsystem (IMS) based delivery that requires development of new handset clients, new IMS core and IMS messaging applications. Another conventional approach proposes circuit switched fallback that involves updating existing 2G and 3G mobile switching centers (MSCs), which involves substantial development and substantial time to deploy across a large embedded base of MSCs. The systems disclosed herein, provide a simplified architecture and infrastructure to deliver SMS in an LTE environment. The disclosed system can be easily implemented and thus SMS support in the LTE environment can be introduced in a short time frame. Further, the cost to deploy the SMS functionality while building on standards and interfaces defined in Third Generation Partnership Project (3GPP) specifications can be reduced.

Aspects, features, or advantages of the subject innovation can be exploited in substantially any wireless communication technology; e.g., Wi-Fi, Worldwide Interoperability for Microwave Access (WiMAX), Enhanced General Packet Radio Service (Enhanced GPRS), 3GPP, LTE, Third Generation Partnership Project 2 (3GPP2) Ultra Mobile Broadband (UMB), High Speed Packet Access (HSPA), or Zigbee. Additionally, substantially all aspects of the subject innovation can be exploited in legacy telecommunication technologies. Further, it can be appreciated that LTE standards as defined by the technical specification defined by the 3GPP's Technical Specification Group Services and System Aspects entitled "Architecture enhancements for non-3GPP accesses, Release 8" and identified as "3GPP TS 23.402 V8.4.1 (2009-01)", which is incorporated herein by reference in its entirety, can be utilized for various aspects disclosed herein.

Referring initially to FIG. 1, there illustrated is an example system 100 that facilitates SMS delivery in an LTE environment 102, according to an aspect of the subject disclosure. Moreover, the system 100 can utilize 4G technology for communication that can employ an all-Internet Protocol (IP) network. A user equipment (UE) 104 can be utilized by a subscriber to communicate via the LTE network. It can be appreciated that the UE 104 can include most any LTE-based communication device, such as, but not limited to, a cell phone, a digital media player, a gaming console, a digital camera, a video recorder, a personal digital assistant (PDA), a personal computer, laptop, etc. It can be appreciated that the UE 104 can be mobile (e.g. cell phone), have limited mobility (e.g. a desktop computer) and/or be stationary (e.g. LTE-based home device/appliance).

Typically, the UE 104 can attach to an Evolved UMTS Terrestrial Radio Access Network (E-UTRAN), to access the evolved packet core (EPC) 106. The EUTRAN is an air interface based on standards specified by the 3GPP that can provide a high-data-rate, low-latency and packet-optimized Orthogonal Frequency-Division Multiple Access (OFDMA) radio-access technology. The E-UTRAN consists of Evolved NodeBs (eNodeBs), for example, eNodeB 108, which provide the radio interface toward the UE 104. According to an aspect, the UE 104 can connect to the eNodeB 108 to facilitate communication with the EPC 106. The eNodeB 108 is generally an enhanced base station that can provide the LTE air interface and perform functions, such as, but not limited to, radio resource management, admission control, scheduling, enforcement of negotiated uplink (UL) Quality of Service (QoS), cell information broadcast, ciphering and/or deciphering of user and control plane data, and compression and/or decompression of downlink (DL) and/or UL user plane packet headers. In particular, the eNodeB 108 can host the PHYsical (PHY), Medium Access Control (MAC), Radio Link Control (RLC), and Packet Data Control Protocol (PDCP) layers that include the functionality of user-plane header-compression and encryption. Further, the eNodeB 108 can support Radio Resource Control (RRC) functionality corresponding to the control plane.

According to an aspect, the eNodeB 108 can connect to the EPC 106 via IP-based S1 interfaces. The detailed specifications for the E-UTRAN radio interface and radio access network are specified in 3GPP specification TR 25.913, which is incorporated by reference herein. Typically, the eNodeB 108 can employ two interfaces to the EPC 106, for example, a S1-C interface for the control plane, which is connected to a Mobility Management Entity (MME) 110, and a S1-U interface for the user plane, which is connected to a Serving Gateway (SGW) (not shown).

The MME 110 can perform functions, such as but not limited to signaling and control functions that manage the UE 104 access to network connections, assignment of network resources, and/or management of the mobility states to support tracking, paging, roaming and handovers. In addition, the MME 110 can control control-plane functions related to subscriber and session management and can communicate to the eNodeB via the S1-C interface. Although only one eNodeB 108 is shown in FIG. 1, the MME 110 can manage and communicate with multiple eNodeBs. In addition, the MME 110 can facilitate idle mode UE tracking and paging procedure including retransmissions. Further, the MME can facilitate authenticating the user (e.g., by interacting with a Home Subscriber Service (HSS) database). Furthermore, the MME 110 can be a termination point in the network for ciphering/integrity protection for Non-Access Stratum (NAS) signaling and can handle security key management.

According to an embodiment, the MME 110 communicates directly with a Short Message Service Center (SMSC) to facilitate delivery of SMS with respect to UE 104. Typically, a UE 104 sends a text message (e.g., SMS message) to another UE 9 not shown), the message gets stored in the SMSC, which can delivers the text message to the destination UE when the destination UE is available. In one aspect, an interface 114 can be utilized to facilitate direct communication between the MME 110 and the SMSC 112. For example, the interface 114 can be most any Signaling System Number 7 (SS7)-based interface, such as the Gd interface defined between the Serving GW Support Node (SGSN) and the SMSC, which is used to exchange SMS messages. In particular, the Gd interface can utilize Mobile Application Part (MAP) protocol, for example, MAP1, MAP2 or MAP3. In another example, the interface 114 can be an IP based (e.g., SS7 over IP) interface. Accordingly, the MME 110 can utilize an interface 114 to directly communication with the SMSC 112 and does not involve communication with an intermediate mobile switching center (MSC), as utilized by conventional systems.

In one aspect, when the UE 104 sends a SMS message, the eNodeB 108 can direct the SMS message to the MME 110. Moreover, the delivery of the SMS message over the LTE air interface can leverage circuit switch (CS) fallback delivery procedures. As noted above, the eNodeB 108 can utilize the S1-C interface to deliver the SMS to the MME 110. According to an aspect, the MME 110 can employ the direct interface 114 to deliver the received SMS to the SMSC 112. In another aspect, when the SMSC 112 receives an SMS for UE 104, for example, from a disparate UE 120 via MME 110 or a disparate MME 116 and/or eNodeB 118, the SMSC 112 can store the received SMS, identify the MME 110 that serves UE 104 can directly deliver the SMS to the MME 110 via interface 114 when the UE 104 is available to receive the SMS. The MME 110 can then deliver the SMS to UE 104 via eNodeB 108, employing CS fallback delivery procedures.

Figure 2A:
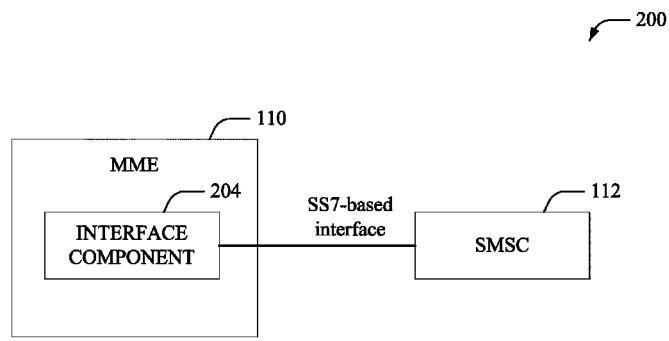
FIGS. 2A and 2B illustrate example systems that can be employed to deliver SMS in an all-Internet Protocol (IP) LTE network.
Figure 2B:
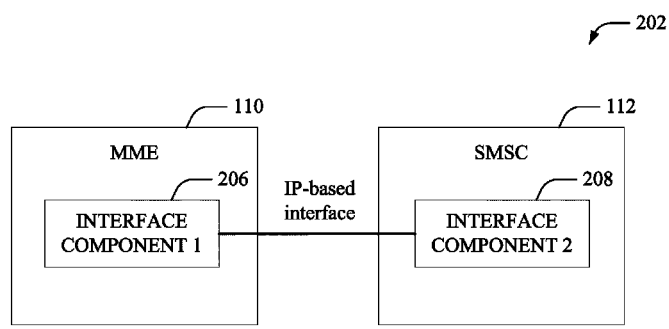

FIGS. 2A and 2B illustrate example systems 200 and 202 that can be employed to deliver SMS in an all-IP LTE network in accordance with an aspect of the subject innovation. It can be appreciated that the MME 110 and the SMSC 112 can include functionality, as more fully described herein, for example, with regard to system 100. Moreover, systems 200 and 202 enable MME 110 and SMSC 112 to communicate directly, for example, without employing intermediate network elements, such as, but not limited to, an MSC.

Referring now to FIG. 2A, there illustrated is an interface component 204 that can be included within MME 110 to facilitate communication between the MME 110 and SMSC 112. In one aspect, the interface component 204 can be employed to deliver SMS messages from the MME 110 to the SMSC 112 and receive SMS messages at the MME 110 from the SMSC 112. As an example, the interface component 204 can utilize a protocol supported by the SMSC 112, such as, but not limited to a MAP protocol. Accordingly, the interface component 204 can provide most any SS7-based interface, such as but not limited to, a Gd interface at the MME 110 that can enable the MME 110 to transfer information to the SMSC 112, for example, via MAP1, MAP2, and/or MAP3 protocol.

In one aspect the interface component 204 can facilitate mapping/translation/encapsulation/decapsulation of information sent to or received from the SMSC 112. For example, during delivery of an SMS to the SMSC 112 from the MME 110, the interface component can perform mapping/translation/encapsulation to convert the SMS to a protocol supported by the SMSC 112. Accordingly, system 200 provides development of an interface only on the MME 110 and the SMSC 112 can remain substantially unaltered. Building an interface directly onto the MME 110 from the messaging complex can bypass the development on conventional switching infrastructure (e.g., MSCs) and enable removal of the conventional switching infrastructure from the delivery mechanism. Further, utilization of the interface component 204 for communication provides minimal development and thus reduces deployment costs and time to market.

Referring now to FIG. 2B, there illustrated is an alternate system 202 that can be employed to deliver SMS in an all-IP LTE environment. According to an aspect, an IP based interface can be utilized for communication between MME 110 and SMSC 112. For example, an SS7 over IP (SS7oIP) interface can be employed to provide a direct connection between the MME 110 and the SMSC 112. Moreover, interface component1 206 and interface component2 208 can facilitate mapping/translation/encapsulation/decapsulation of information transferred between the MME 110 and the SMSC 112. For example, the interface component1 206 can be employed by the MME 110 when sending a SMS, received from a UE, to the SMSC 112. The interface component2 208 can receive the SMS delivered over the IP based interface and convert/translate/map/decapsulate the SMS to a protocol supported by the SMSC 112. Similarly, the interface component2 208 can be employed by the SMSC 112 to convert/translate/map/encapsulate a SMS when delivering the SMS to the MME 110 over the IP-base interface. The interface component1 206 can receive the SMS delivered over the IP based interface, convert/translate/map/decapsulate the SMS and deliver the SMS to the destination UE via an eNodeB. In addition, the interface component2 208 can be employed by the SMSC 112 to convert/translate/map/encapsulate a delivery report when sending the delivery report to the MME 110 over the IP-base interface. The interface component1 206 can receive the delivery report over the IP based interface, convert/translate/map/decapsulate the report and deliver the report to the destination UE via an eNodeB In contrast to system 200, system 202, provides development of an interface on both the MME 110 and the SMSC 112. However, the system 202 moves towards an all-IP architecture by utilizing an IP-based interface for communication. In addition, system 202 provides a low-cost and efficient alternative to deploy SMS in an LTE system and a quicker time to market than traditional approaches. Further, system 202 provides a standalone SMS LTE deployment without utilizing a traditional 2G or 3G infrastructure.

Figure 3:
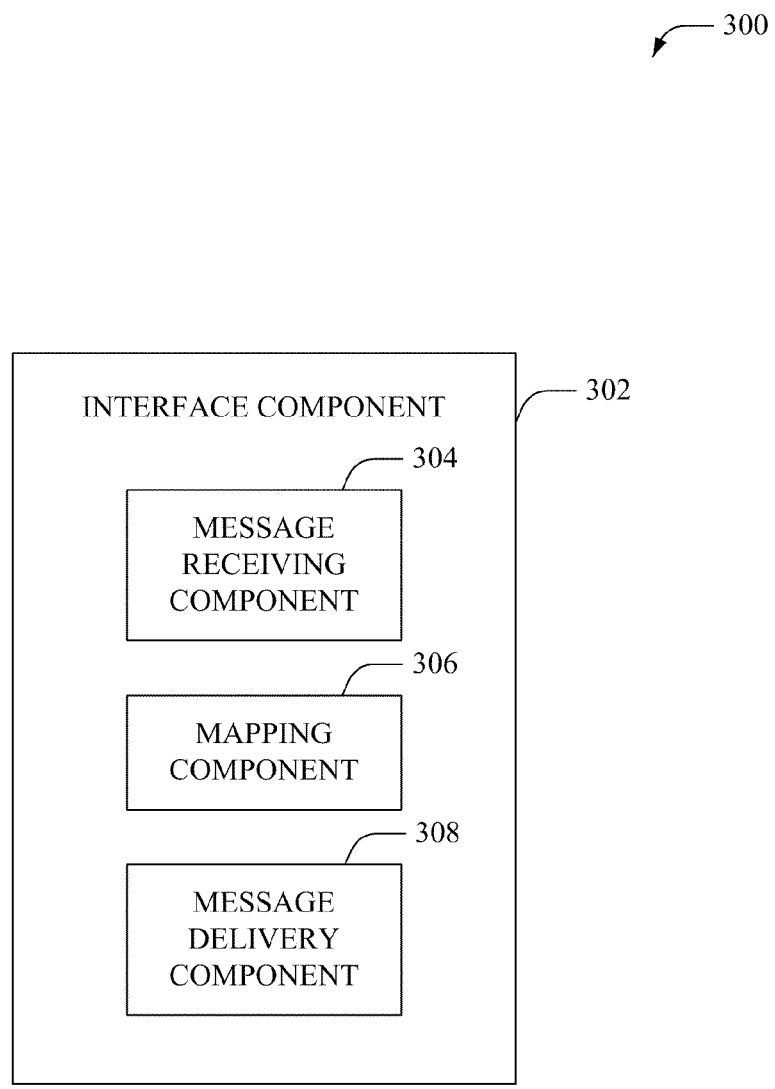
FIG. 3 illustrates an example block diagram of a component that facilitates communication between an MME and SMSC for SMS delivery.

FIG. 3 illustrates an example block diagram 300 of an interface component 302 that facilitates communication between an MME and SMSC for SMS delivery. It can be appreciated that the interface component 302 can be substantially similar to interface component 204, interface component1 206 and interface component 208 and can include functionality, as more fully described herein, for example, with regard to system 200. Further, it can be appreciated that interface component 302 can reside within or be operatively connected to the MME, and/or can reside within or be operatively connected to the SMSC.

In one aspect, the interface component 302 can include a message receiving component 304 that receives an SMS. As an example, when the interface component 302 resides within the MME, the message receiving component 304 can be employed to receive an SMS from a UE via an eNodeB, over the S1-C interface. Additionally, a mapping component 306 can be utilized to deliver the SMS from the MME to the SMSC via a protocol supported by the SMSC, for example, SS7-based protocol. In one aspect, the mapping component 306 can convert, translate, map and/or encapsulate the SMS to conform to the SS7-based protocol. Further, a message delivery component 308 can be utilized to transfer the SMS from the mapping component 306 to the SMSC. According to an embodiment, the message receiving component 304 can also be employed to receive a message (e.g., SMS, delivery report, etc.) sent by the SMSC over the SS7-based interface (e.g., Gd interface). Moreover, the mapping component 306 can convert, translate, map and/or decapsulate the message, such that the message conforms to the protocol supported by the MME. Further, the message delivery component 308 can also be employed to deliver the message from the mapping component 306 to a destination UE via an eNodeB, over the S1-C interface.

According to another example, the MME and SMSC can each utilize an interface component 302 to facilitate a direct connection. In this case, the interface component 302 within the MME can utilize a the message receiving component 304 to receive an SMS from a UE via an eNodeB, over the S1-C interface, and/or to receive a message (e.g., SMS, delivery report, etc.) sent by the SMSC over an IP-based interface, for example, SS7oIP interface. Further, the interface component 302 within the MME can include a mapping component 306 can be utilized to deliver the SMS from the MME to the SMSC via an IP-based protocol. In addition, the mapping component 306 of the MME can facilitate conversion, translation, mapping, encapsulation and/or decapsulation of the SMS received from the UE and/or the message received from the SMSC via the SS7oIP interface. In one aspect, the message delivery component 308, included within the MME, can be utilized to deliver the message to its destination, for example, delivering the SMS from the mapping component 306 to the SMSC via the SS7oIP interface, or delivering the message from the SMSC to the destination UE via an eNodeB, over the S1-C interface.

In yet another example, the interface component 302 can reside within the SMSC, when an IP-based interface is utilized. In particular, the interface component 302 within the SMSC can utilize a message receiving component 304 to receive an SMS, for example, from an MME (e.g., over the SS7oIP interface) and a mapping component 306 to convert, translate, map and/or decapsulate the SMS, such that the SMS conforms to the protocol supported by the SMSC. Typically, the SMSC can query a database (e.g., HSS, Home Location Register (HLR), etc.) to identify an MME that serves a destination UE associated with the received SMS. Once identified, the SMSC can utilize the mapping component 306 to convert, translate, map and/or encapsulate the SMS and the message delivery component 308 to deliver the SMS to the MME via the SS7oIP interface. In addition, the message receiving component 304 of the interface component 302 that resides within the SMSC, can also receive a delivery report from a destination MME (e.g., over the SS7oIP interface), for example, sent by a destination UE reporting the success of failure of SMS delivery. Further, the SMSC can utilize the mapping component 306 to convert, translate, map, encapsulate and/or decapsulate the delivery report the message delivery component 308 to deliver the delivery report to a source MME via the SS7oIP interface.

Figure 4:
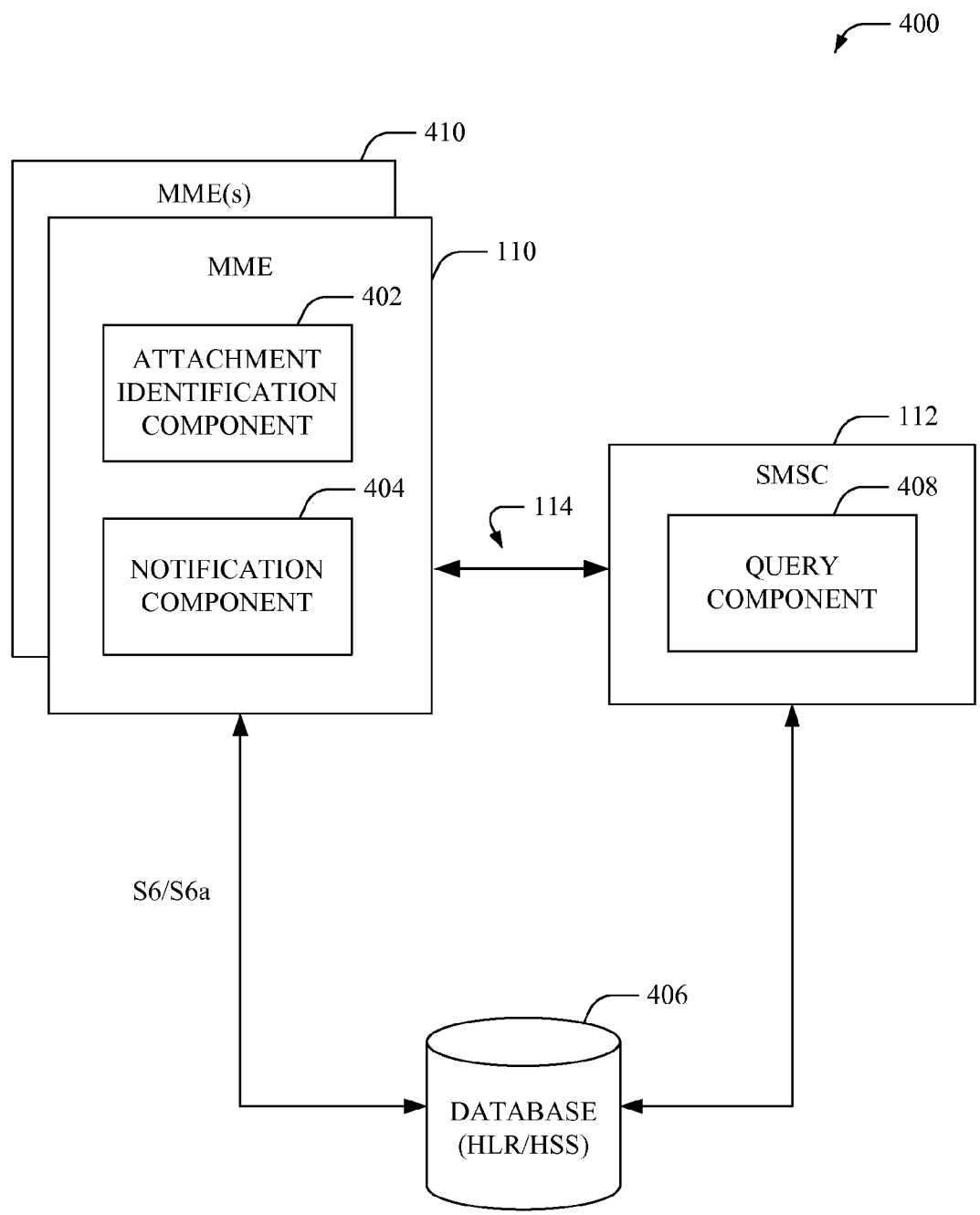
FIG. 4 illustrates an example system that facilitates identification of a Mobility Management Entity (MME) that serves a user equipment (UE) for delivery of an SMS to the UE.

Referring now to FIG. 4, there illustrated is an example system 400 that facilitates identification of a MME that serves a UE for delivery of an SMS to the UE, according to an aspect of the subject specification. It can be appreciated that the MME 110, SMSC 112 and interface 114 can include functionality, as more fully described herein, for example, with regard to systems 100 and 200. Typically, the MME 110 can include an attachment identification component 402 that can identify when a UE attaches to a E-UTRAN served by the MME. For example, the UE can attach to an eNodeB and register with the MME 110. In one aspect, the attachment identification component 402 can determine whether the UE is authorized to access the LTE network and can provide a list of authorized UEs that are currently attached to the E-UTRAN to a notification component 404. Moreover, the attachment identification component 402 can also determine when an authorized UE attached to the network detaches, for example, moves out of a coverage area of the eNodeBs associated with the MME. Accordingly, the attachment identification component 402 can update the notification component 404 with the current information.

In one aspect, the notification component 404 can transfer attachment information to a database 406, such as but not limited to, a HSS and/or an HLR. Further, the notification component 404 can update the database 406 based on information received from the attachment identification component 402, associated with UE attachment and/or detachment. Moreover, the notification component 404 can enable transfer of subscription and authentication data for authenticating/authorizing user access to the LTE system between MME 110 and database 406. As an example, an S6 interface can be utilized for communication between the MME 110 and database 406 in home network and/or an S6a interface can be utilized for communication between the MME 110 and database 406 in visited network. The database 406 can be most any database that can store UE records, including data identifying a MME to which the UE is currently attached. In addition, database 406 can also store information regarding UE availability. It can be appreciated that the database 406 can be connected to multiple MMEs 410. Additionally, it can be appreciated that multiple databases and/or distributed databases can also be employed to store UE information.

Typically, when a SMSC 112 receives a SMS, a query component 408 can be utilized to store the SMS and retrieve information associated with the destination of the SMS from the database 406. Moreover, the database 406 can be queried, by the query component, for the information identifying a MME to which the destination UE is currently attached. For example, if the destination UE is attached to MME 110, the database can transfer information, such as but not limited to an ID or address of MME 110 to the query component. In addition, database 406 can deliver information associated with the availability of the destination UE to the SMSC. For example, if the destination UE is currently unavailable, the database 406 can send information associated with the unavailability to the query component 408, which can store the SMS until the destination UE is available. When the database 406 is updated with information indicating that the destination UE is currently available, the database 406 can notify the query component 408, and the SMSC 112 can facilitate delivery of the SMS to the available destination UE.

In one aspect, the SMSC 112 utilizes the information received from the database 406 to transfer the SMS directly to the identified MME 110 over the interface 114, without employing intermediate network elements. As noted previously, interface 114 can include, but is not limited to an SS7-based interface (e.g., Gd) and/or SS7oIP. It can be appreciated that the only MME 110, or both the MME 110 and the SMSC, can include an interface component (not shown) to facilitate direct communication over the interface 114.

Further, it can be appreciated that the database 406 can include volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data stores, databases) of the subject systems and methods is intended to comprise, without being limited to, these and any other suitable types of memory.

Figure 5:
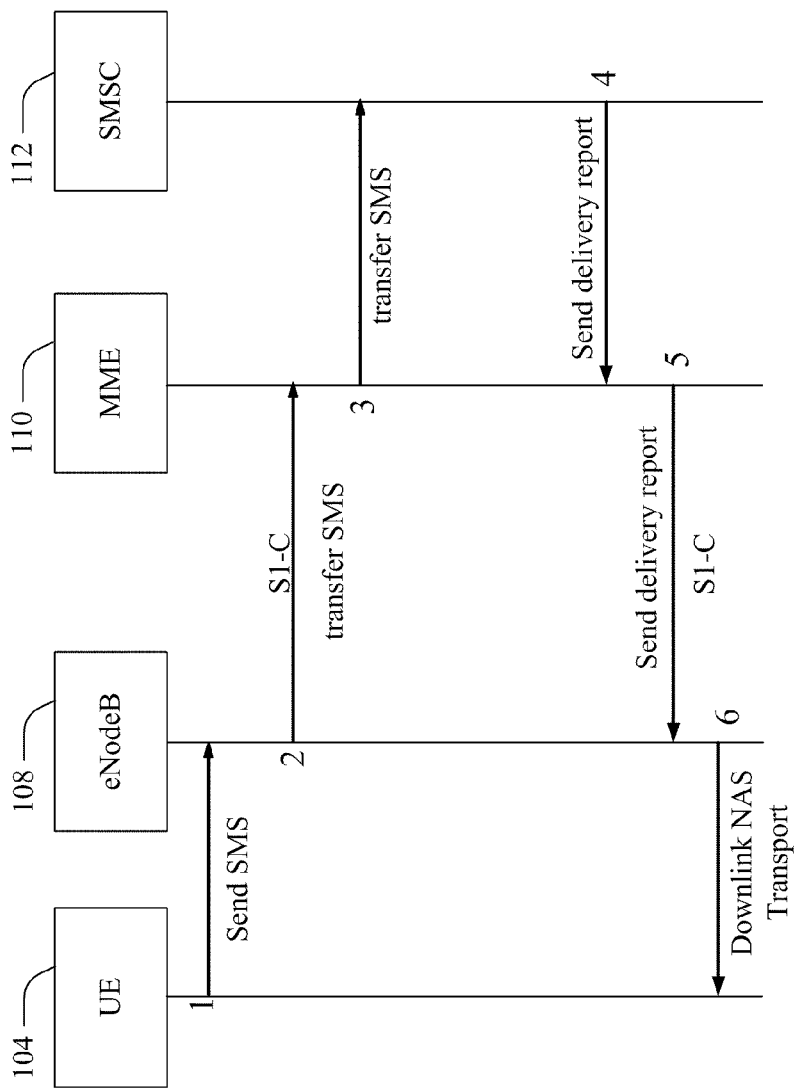
FIG. 5 illustrates an example flow diagram for sending a SMS in an LTE network.

FIG. 5 illustrates an example flow diagram 500 for sending a SMS in an LTE network, according to an aspect of the subject innovation. According to an aspect, a user can employ UE 104 to compose an SMS. For example, the user can input text via a keypad, a touch screen, on the UE 104 and/or employ a voice recognition mechanism to convert audio input to a SMS message. Moreover, UE 104, as disclosed herein can be, but is not required to be, for instance, an LTE-based communication device, a multi-mode device, a dual-mode device, a dual-mode cellular/IP device, a mobile communication device, a smartphone, a gaming device, a home media center, a portable media player, a satellite phone, a desktop device, a cellular phone, a portable gaming device, a mobile phone, a portable music player, a portable device, a laptop, a personal digital assistant, or a handheld or combinations thereof. It can be appreciated that the UE 104, eNodeB 108, MME 110, SMSC 112 and interface 114 can include functionality, as more fully described herein, for example, with regard to systems 100 and 200.

Typically, the UE 104 can attach to an eNodeB 108 when the UE 104 enters the coverage area of the eNodeB 108. When the user composes and sends the SMS to a destination UE (not shown), for example, a disparate cellular phone, the UE 104 can forward the message to the eNodeB 108 via the air interface, as shown at step 1.

According to an aspect, the UE 104 can build the SMS message to be sent as defined in 3GPP specification TS 23.040 [14] (e.g., the SMS message consists of CP-DATA/RP-DATA/TPDU/SMS-SUBMIT parts). Further, the SMS message can be encapsulated in an NAS message and sent to the MME 110. At step 2, the eNodeB 108 can direct the SMS to an MME 110 associated with the eNodeB 108 in an evolved packet core. As an example, the SMS can be transferred by the eNodeB 108 to the MME 110 over an S1-C interface. In accordance with an embodiment, at step 3, the MME 110 can transfer the SMS directly to the SMSC 112. In one example, a SS7-based interface can be utilized, such as, but not limited to, a Gd interface. In another example, an SS7oIP interface can be utilized to communicate between the MME 110 and the SMSC 112.

In one aspect, the SMSC 112 can deliver the SMS to the destination UE, whenever the destination UE is available, and can receive a delivery report. For example, the delivery report can include information indicating whether the SMS was delivered successfully or not. At step 4, the delivery report can be sent directly to the MME 110 via an SS7-based interface or an SS7oIP interface. It can be appreciated that an interface component (FIG. 3) can be utilized to facilitate direct communication between the MME 110 and the SMSC 112. In particular, if the SS7-based interface is utilized (e.g., which is supported by the SMSC 112), then the interface component is employed only by the MME 110. However, if the SS7oIP interface is employed, then the MME 110 and the SMSC 112 can each employ an interface component for communication.

At step 5, the MME 110 can send the delivery report to the eNodeB 108 over the S1-C interface. Further, at step 6, the eNodeB 108 transfers the delivery report the UE 104 via the downlink. As an example, the UE 104 can provide a notification and/or alert to indicate receipt of the delivery report.

Figure 6:
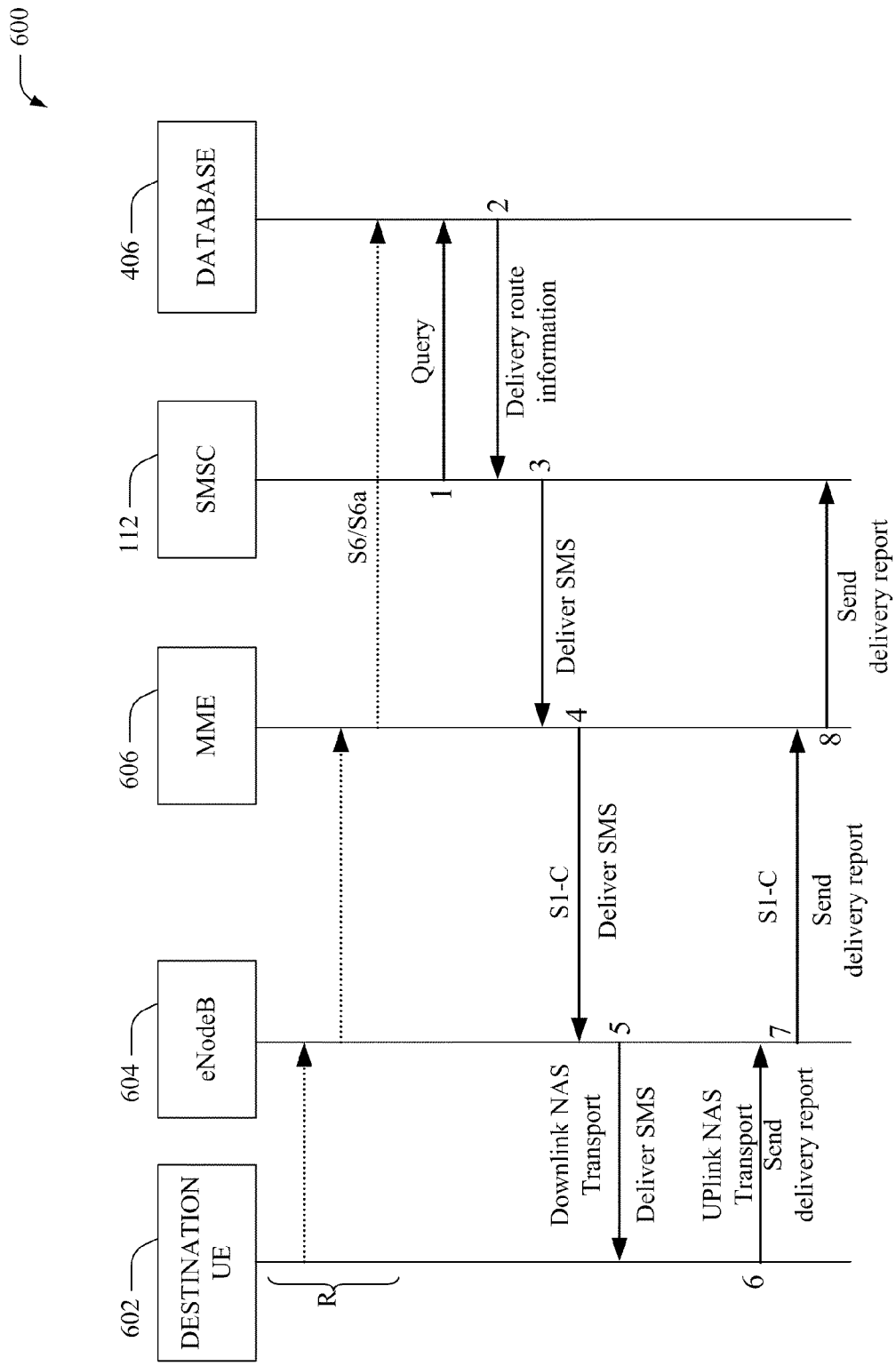
FIG. 6 illustrates an example flow diagram that depicts a sequence to receive an SMS at a destination UE in an LTE environment.

FIG. 6 illustrates an example flow diagram 600 that depicts a sequence to receive an SMS at a destination UE 602 in an LTE environment, according to an aspect of the subject disclosure. It can be appreciated that the SMSC 112 and interface 114 can include functionality, as more fully described herein, for example, with regard to systems 100 and 200. Further, it can be appreciated that the destination UE 602, eNodeB 604, and MME 606 can be substantially similar to UE 104, eNodeB 108, and MME 110, respectively and can include respective functionality, as more fully described herein, for example, with regard to systems 100 and 200.

Typically, the UE 602 can employ most any attachment and/or registration procedure to register with the database (e.g., HSS, HLR). As shown at step R, the UE 602 can register with the database 406 via the eNodeB 604 and MME 606. As an example, the UE 602 can employ a CS Fallback attach procedure for registration. It can be appreciated that the MME 606 can utilize an S6 interface in home network and/or an S6a interface 406 in visited network for communication with database 406. According to an aspect, a SMSC 112 can receive a SMS for delivery to the destination UE 602. At step 1, the SMSC 112 can query the database 406 for information that facilitates identification of a route for the received SMS as well as information that indicates the availability of the destination UE 602. For example, the database 406 can be requested for information identifying an MME 606 to which the destination UE 602 is connected. At step 2, the SMSC 112 can receive the requested information from the database 406. In one aspect, at step 3, when determined that the destination UE 602 is available, the SMSC 112 can deliver the SMS directly to the MME 606 via an SS7-based interface or an SS7oIP interface. Specifically, if the SS7-based interface is utilized (e.g., which is supported by the SMSC 112), then an interface component, as disclosed herein can be employed only by the MME 606. Alternately, if the SS7oIP interface is employed, then both the MME 606 and the SMSC 112 can employ interface components for communication.

According to an aspect, the MME 606 can initiate a paging procedure (not shown) if determined that the UE 602 is idle. Alternately, if the UE 602 is active, the MME 606 does not employ the paging procedure. Typically, the MME 606 can encapsulate the SMS message in a NAS message and send the SMS to the eNodeB 604 to which the destination UE 602 is attached, for example, over the SC-1 interface, as shown at step 4. Further, at step 5, the eNodeB 604 can deliver the SMS to the destination UE 602 on the DL via the air interface.

Furthermore, at step 6, the destination UE 602 can return a delivery report to the eNodeB 604. In one example, the delivery report can be encapsulated in an NAS message and sent to the eNodeB 604. At step 7, the delivery report can be transferred to the MME 606 over the S1-C interface. In one aspect, the MME 606 can send the delivery report to the SMSC 112 via the SS7-based interface or the SS7oIP interface. As described previously, an interface component (FIG. 3) as disclosed herein, can be utilized by the MME 606 when the SS7-based interface is utilized (e.g., which is supported by the SMSC 112), or both the MME 606 and the SMSC 112 can utilize respective interface components when the SS7oIP interface is employed.

Figure 7:
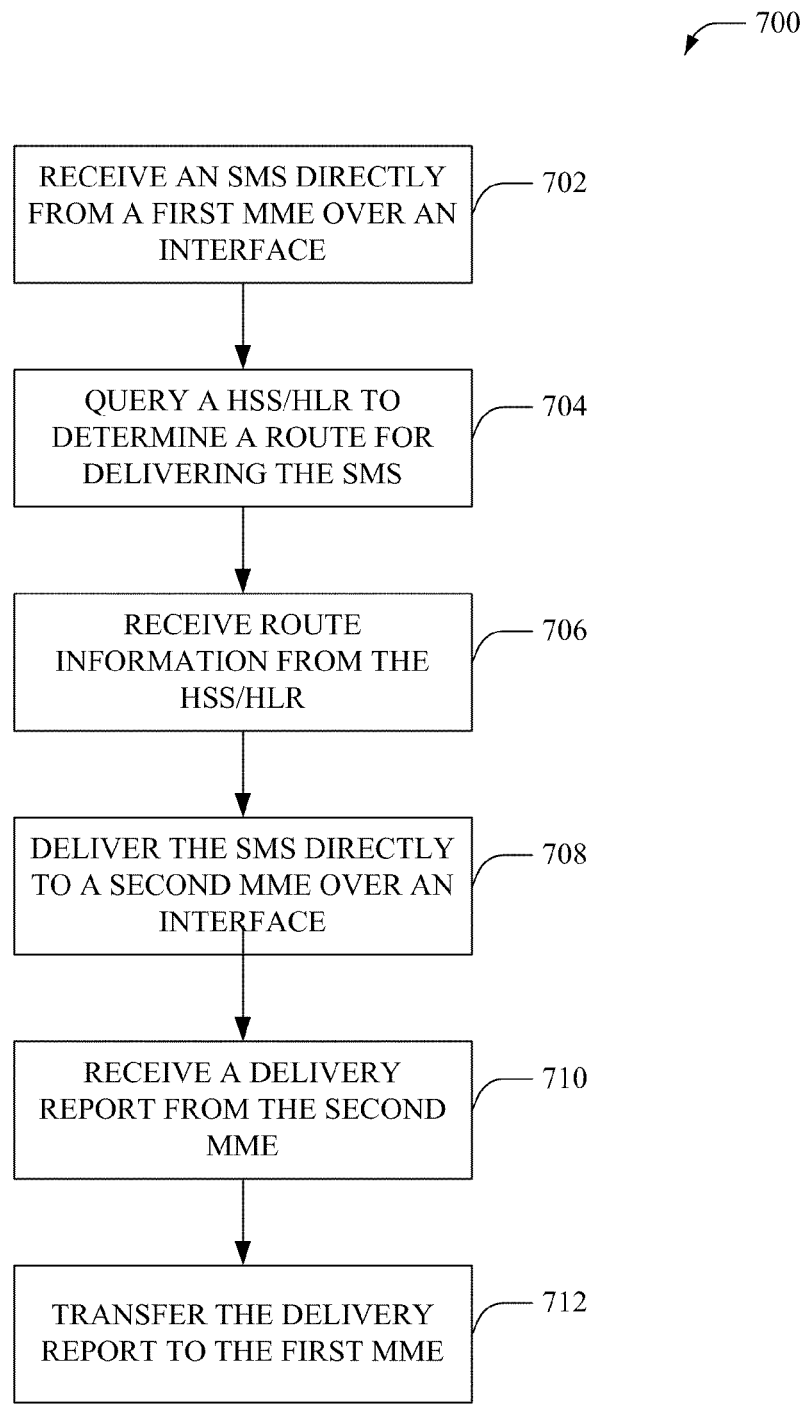
FIG. 7 illustrates an example methodology that can be utilized to facilitate SMS delivery in an LTE environment.
Figure 8:
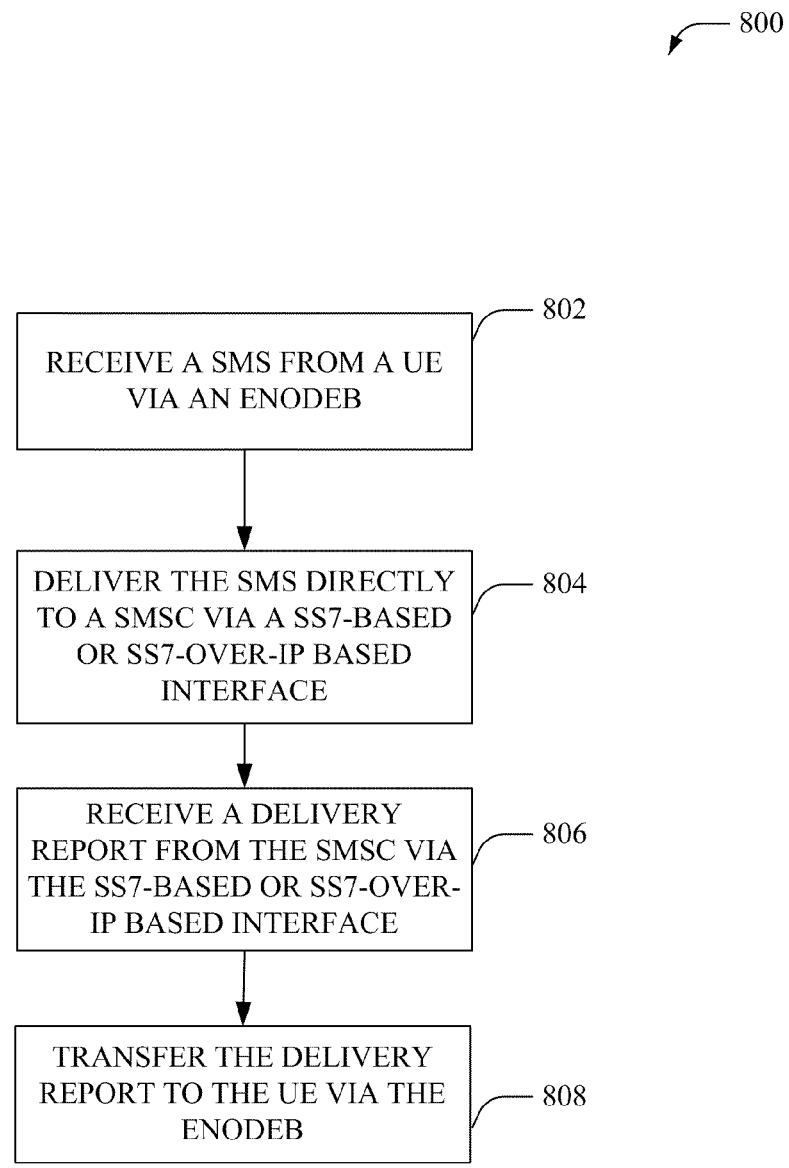
FIG. 8 illustrates an example methodology that facilitates direct communication between an MME and SMSC for SMS delivery in an LTE network.

FIGS. 7-8 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIG. 7, illustrated is an example methodology 700 that can be utilized to facilitate SMS delivery in an LTE environment in accordance with an aspect of the subject disclosure. Utilization of methodology 700 can speed the introduction of SMS in the LTE environment and can lower the cost to deploy the SMS capability while building on standards and interfaces defined in the 3GPP specifications. Specifically, methodology 700 can include creating an interface between a MME and a SMSC, such as, a SS7-based interface or an IP-based interface.

At 702, an SMS can be directly received from a first MME over an interface, for example, at an SMSC, without employing one or more intermediate network elements for communication (e.g., MSC). According to an aspect, the interface utilized, can be a SS7-based interface, such as a Gd interface, or an IP based interface, such as a SS7oIP interface. At 704, a HSS and/or HLR can be queried to determine a route for delivering the SMS and destination UE availability. In one example, the HSS and/or HLR can be queried with information associated with a destination UE, such as, but not limited to, UE ID, UE address, UE number, etc. Typically, on accessing the LTE network, a UE can register with an HSS and/or HLR. As an example, the HSS and/or HLR can store information associated with a MME to which the UE is attached. It can be appreciated that although an HSS and/or HLR is utilized, the specification is not so limited and most any database can be employed. At 706, route information can be received from the HSS and/or HLR, in response to the query. For example, the route information can include, but is not limited to, information identifying a second MME to which the UE is attached, UE availability data, etc. It can be appreciated that in an exemplary case the first and second MME can be the same, for example, when both source and destination UEs are attached to the same MME.

At 708, the received SMS can be directly delivered to a second MME over the SS7-based or IP-based interface, for example, without transferring the SMS to an intermediate network element (e.g., MSC). Moreover, the second MME can utilize most any encapsulation technique (NAS encapsulation) and send the encapsulated SMS to an eNodeB to which the destination UE is attached, for example, over a SC-1 interface. Further, the eNodeB can deliver the SMS to the destination UE on a DL via an air interface. On receipt of the SMS (or failure to deliver the SMS), a delivery report can be generated and routed to the second MME. At 710, the delivery report can be received from the second MME over the SS7-based or IP-based interface (e.g., at the SMSC). Furthermore, at 712, the delivery report can be transferred to the first MME over the SS7-based or IP-based interface. Moreover, the first MME can then send the delivery report to the source UE and notify the source UE of successful or unsuccessful SMS delivery.

FIG. 8 illustrates an example methodology 800 that facilitates direct communication between an MME and SMSC for SMS delivery in an LTE network, according to an aspect of the subject innovation. Typically, the LTE network can utilize 4G technology for communication that can employ an all-IP network. A UE can attach to the LTE network via a E-UTRAN that comprises an eNodeB. For sending an SMS, the UE can employ most any CS fallback procedure to transmit the SMS to the eNodeB, for example, over the air interface.

At 802, the SMS can be received from the UE via the eNodeB (e.g., by the MME). In one example, the SMS can be received at the MME from the eNodeB, over the S1-C interface. At 804, the SMS can be delivered directly to a SMSC via a SS7-based (e.g., Gd) or IP-based (e.g., SS7oIP) interface. As an example, the SMS can be converted, translated, mapped and/or encapsulated for delivery via the interface to the SMSC, such that, an intermediate network element (e.g., MSC) is not utilized for the communication. Typically, the SMSC can deliver the SMS to the destination UE by employing a direct interface to an MME. Further, a delivery report that indicates, successful or unsuccessful delivery of the SMS can be determined by the SMSC.

At 806, the delivery report can be received from the SMSC via the SS7-based (e.g., Gd) or IP-based (e.g., SS7oIP) interface. At 808, the delivery report can be transferred to the UE via the eNodeB. For example, the delivery report can be sent to the eNodeB over the S1-C interface, which in turn can transmit the delivery report the UE via the downlink. Further, the UE can notify a user, for example, by employing an alarm that indicates information regarding the delivery of the SMS (success or failure).

Figure 9:
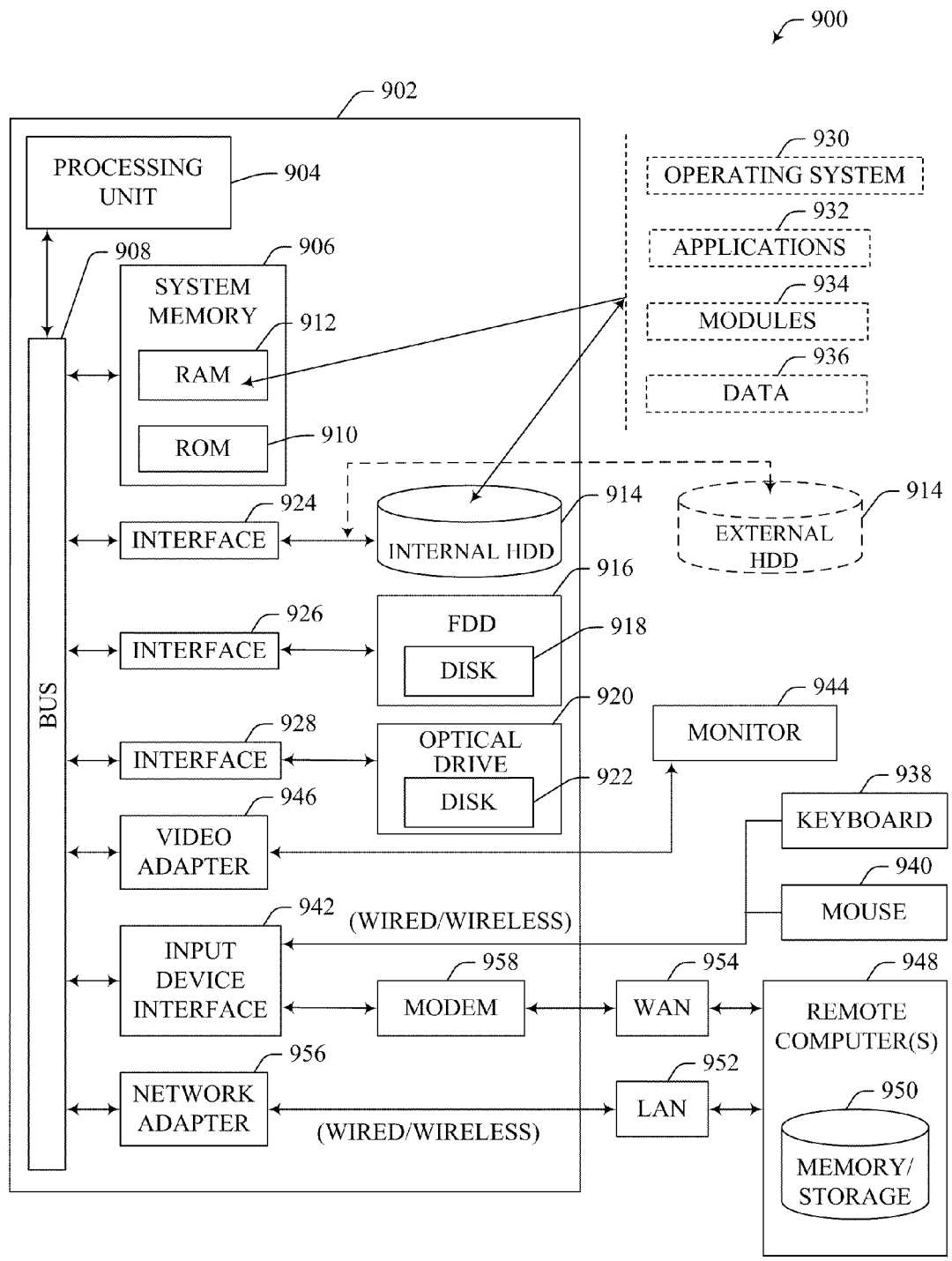
FIG. 9 illustrates a block diagram of a computer operable to execute the disclosed communication architecture.

Referring now to FIG. 9, there is illustrated a block diagram of a computer operable to execute the disclosed communication architecture. In order to provide additional context for various aspects of the subject specification, FIG. 9 and the following discussion are intended to provide a brief, general description of a suitable computing environment 900 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the example environment 900 for implementing various aspects of the specification includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a nonvolatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 can also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the specification can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) can include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 can operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 is connected to the local network 952 through a wired and/or wireless communication network interface or adapter 956. The adapter 956 can facilitate wired or wireless communication to the LAN 952, which can also include a wireless access point disposed thereon for communicating with the wireless adapter 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are example and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a memory to store computer-executable instructions; and
a processor of a short message service center device deployed within an internet protocol-based telecommunication network and is communicatively coupled to a mobility management entity device by employing a signaling system number 7 over internet protocol, wherein the processor is communicatively coupled to the memory and facilitates execution of the computer-executable instructions to perform operations comprising:
receiving text message data by the short message service center device from the mobility management entity device by employing the signaling system number 7 over internet protocol, independent of utilization of an intermediate network device to facilitate receipt of the text message data, and
conforming the text message data to another protocol supported by the short message service center device.

2. The system of claim 1, wherein the protocol supported by the short message service center device includes a signaling system number 7-based protocol.

3. The system of claim 2, wherein the signaling system number 7-based protocol is a mobile application part protocol.

4. The system of claim 1, wherein the conforming includes decapsulating the text message data.

5. The system of claim 1, wherein the text message data is first text message data and the conforming includes mapping of the first text message data to second text message data.

6. The system of claim 1, wherein the mobility management entity device is a first mobility management entity device and the operations further comprise:
querying a network data store for information related to a second mobility management entity device that is associated with a user equipment to which the text message data is directed.

7. The system of claim 6, wherein the operations further comprise:

receiving, from the network data store, the information related to the second mobility management entity device in response to the query.

8. The system of claim 7, wherein the operations further comprise:
facilitating a transmission of the text message data to the second mobility management entity device by employing the signaling system number 7 over internet protocol based on re-conforming, to the signaling system number 7 over internet protocol, the text message data that has been conformed to the other protocol.

9. The system of claim 8, wherein the re-conforming is based on an encapsulation of the text message data.

10. A method, comprising:
receiving, by a system comprising a processor and that is deployed within an internet protocol-based telecommunication network, text message data from a mobility management entity device by employing a signaling system number 7 over internet protocol, independent of transferring the text message data being facilitated via an intermediate network device; and
determining, by the system, a text message as a function of converting the text message data based on a protocol determined to be supported by a short message service center device.

11. The method of claim 10, wherein the converting includes decapsulating the text message data to facilitate the determining.

12. The method of claim 10, wherein the mobility management entity device is a first mobility management entity device and the method further comprises:
facilitating, by the system, a transmission of the data to a second mobility management entity device by employing the signaling system number 7 over internet protocol, in response to determining that the text message is directed to a user equipment that is coupled to the second mobility management entity device.

13. The method of claim 10, further comprising:
in response to the text message being directed to a user equipment that is coupled to the mobility management entity device, facilitating, by the system, a transmission of the data to the mobility management entity device by employing the signaling system number 7 over internet protocol for delivery of the text message to the user equipment.

14. The method of claim 10, further comprising:
querying, by the system, a network data store for route information associated with delivery of the text message.

15. The method of claim 14, further comprising:
in response to the querying, receiving, by the system from the network data store, the route information including information identifying a second mobility management entity device associated with a user equipment to which the text message is directed.

16. The method of claim 15, further comprising:
receiving, by the system, a delivery report associated with the delivery of the text message to the user equipment from the second mobility management entity device via the signaling system number 7 over internet protocol-based network.

17. The method of claim 16, further comprising:
facilitating, by the system, a transmission of the delivery report to the first mobility management entity device by employing the signaling system number 7 over internet protocol.

18. A non-transitory computer readable storage medium comprising computer executable instructions that, in response to execution, cause a system including a processor to perform operations, comprising:
- facilitating a communication between a short message service center device and a mobility management entity device deployed within a internet protocol-based telecommunication network by employing a signaling system number 7 over internet protocol, including bypassing an intermediate network device operable to facilitate a transfer of the text message data during the transfer of the text message data from the mobility management entity device to the short message service center device; and
- determining a text message that conforms to a protocol supported by the short message service center device, based on a protocol mapping applied to the text message data.

19. The system of claim 18, wherein the determining includes decapsulating the text message data.

20. The system of claim 18, wherein the mobility management entity device is a first mobility management entity device, the protocol mapping is a first protocol mapping, and the operations further comprise:
- based on analyzing the text message, determining a destination user equipment to which the text message is directed;
- determining a second mobility management entity device associated with the destination user equipment based on data received from a network data store;
- based on a second protocol mapping, reconverting the text message to the text message data that conforms to the signaling system number 7 over internet protocol; and
- facilitating a transmission of the text message data to the second mobility management entity device by employing the signaling system number 7 over internet protocol.

* * * * *